(12) United States Patent
Holdgrewe et al.

(10) Patent No.: US 6,435,417 B1
(45) Date of Patent: Aug. 20, 2002

(54) METHOD FOR CONTROLLING A HEATING AND/OR AIR CONDITIONING APPARATUS

(75) Inventors: Kai Holdgrewe, Schwaikheim; Klaus-Peter Kuhn, Pluederhausen; Christian Onnen, Esslingen; Andreas Proettel, Leutenbach; Christian Reitter, Stuttgart, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/472,043

(22) Filed: Dec. 27, 1999

(30) Foreign Application Priority Data

Dec. 24, 1998 (DE) .......................... 198 60 235
Feb. 3, 1999 (DE) .......................... 199 04 143

(51) Int. Cl.$^7$ ............................ F23N 5/20; G05B 13/02
(52) U.S. Cl. ..................... 236/46 R; 236/78 D; 700/28
(58) Field of Search .................. 700/28, 32; 236/78 D, 236/91 C, 46 R (56) References Cited

U.S. PATENT DOCUMENTS

| | | | |
|---|---|---|---|
| 5,078,316 A | 1/1992 | Hara et al. | 236/49.3 |
| 5,486,998 A * | 1/1996 | Corso | 700/32 |
| 5,511,724 A | 4/1996 | Freiberger et al. | 236/49.3 |
| 5,579,994 A | 12/1996 | Davis, Jr. et al. | 236/49.3 |
| 6,095,426 A * | 8/2000 | Ahmed et al. | 236/49.3 |

FOREIGN PATENT DOCUMENTS

| | | |
|---|---|---|
| DE | 38 17 495 | 11/1989 |
| DE | 40 23 554 | 2/1992 |
| DE | 44 26 732 | 2/1995 |

* cited by examiner

Primary Examiner—William Wayner
(74) Attorney, Agent, or Firm—Crowell & Moring LLP (57) ABSTRACT

A method for controlling a heating and/or air-conditioning apparatus is provided, wherein, through an intervention unit, a user can perform interventions which lead to different settings of the heating and/or air-conditioning apparatus. Various parameters are read into a control unit and are processed. According to the method, climatic situations are defined by the parameters; upon a user intervention a particular climate situation is detected; the climatic situation is associated with the particular user intervention; and in a prevailing climatic situation the settings of the climate control system pertaining to the associated user intervention are carried out.

21 Claims, 5 Drawing Sheets

METHOD FOR CONTROLLING A HEATING AND/OR AIR CONDITIONING APPARATUS

BACKGROUND AND SUMMARY OF THE INVENTION

This application claims the priority of German Application Nos. 198 60 235.9, filed Dec. 24, 1998 and 199 04 143.1, filed Feb. 3, 1999, the disclosures of which are expressly incorporated by reference herein.

The invention relates to the controlling of a heating and/or air-conditioning apparatus, wherein a user can perform interventions which lead to different settings of the heating and/or air-conditioning apparatus, and further wherein various parameters are read into a control unit and processed.

A method of this kind for controlling a heating and/or air-conditioning apparatus is disclosed in German Patent document DE 40 23 554 C2. The apparatus has an operating unit at which an operator can control its operation. The operating unit also has various adjusting means for one of several alternative programs for controlling temperature and/or distribution of air. For this purpose, various parameters are entered into a control unit, for example by temperature sensors, and are additionally used for temperature control and/or air distribution.

In this type of control of a heating and/or air-conditioning apparatus it is a disadvantage that the personal preferences and desires of the user are not given consideration. Thus, the control system of a heating and/or air-conditioning apparatus provides—perhaps for good reasons from the cybernetic point of view—for the blower to blow at its maximum rate if the interior becomes greatly overheated. Perhaps, however, the user might not like this. He might prefer to perspire rather than tolerate a loud and strong blast of air. He will consequently set the blower lower. The next time again, in the same or a similar situation, however, the blower will turn on at a high speed.

The invention therefore addresses the problem of improving a method for controlling a heating and/or air-conditioning apparatus such that the heating and/or air-conditioning apparatus will automatically operate according to the individual desires and preferences of the operator.

The problem is solved according to the invention by a method for controlling a heating and/or air-conditioning apparatus, wherein a user can perform interventions which lead to different settings of the heating and/or air-conditioning apparatus, and further wherein various parameters are read into a control unit and processed. For the parameters, climatic situations are defined. For a user intervention, a specific climatic situation is recognized. The climatic situation is associated with the user intervention, and in the case of a prevailing climatic situation, the settings of the climate control apparatus that pertain to the associated user intervention are performed automatically. Advantageous embodiments of the invention are described herein.

An important advantage of these embodiments lies in the fact that the heating and/or air-conditioning apparatus is governed not by the mere program but according to the individual desires of a user. Thus, the user's interventions serve to determine the user's preferences in a prevailing climatic situation. The heating and/or air-conditioning apparatus can thus advantageously be adjusted automatically to the learned preferences.

Other objects, advantages and novel features of the present invention will become apparent from the following detailed description of the invention when considered in conjunction with the accompanying drawings.

DETAILED DESCRIPTION OF THE DRAWINGS

Figure 1:
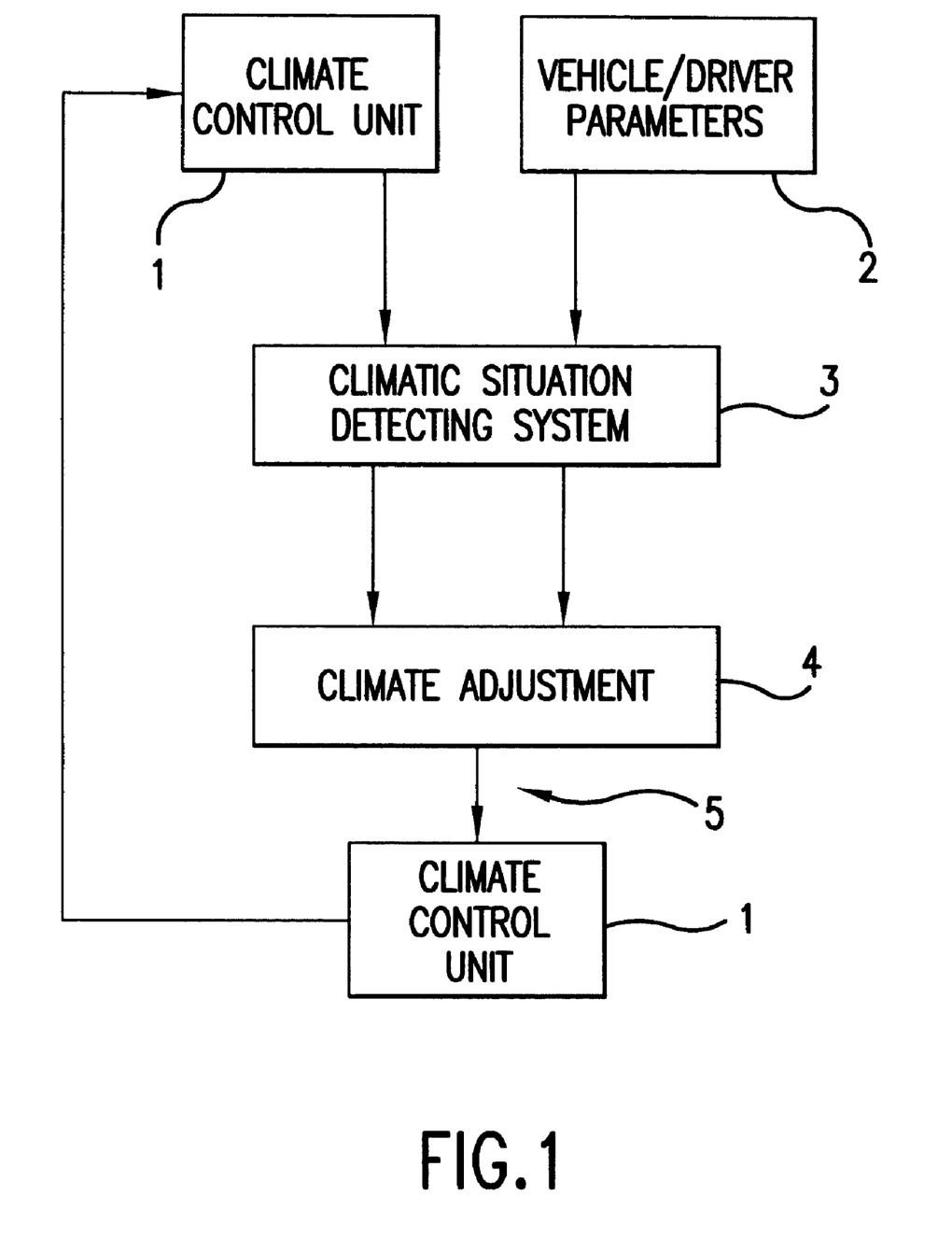
FIG. 1 is a block diagram explaining the control of a heating and/or air-conditioning apparatus according to the invention.

FIG. 1 is a block diagram explaining the control of a heating and/or air-conditioning apparatus. First, the detection of the climatic situation for the purpose of classifying the user interventions will be described. Then, the second part will describe the learning and the placement of user interventions. The user interventions are performed by the user on an operating unit situated in the vehicle. The climate control apparatus 1 feeds the parameters that have been read in, as for example the outdoor temperature and the inside temperature, to a climatic situation detecting system 3. Then, other parameters such as driver type and "nervousness" are needed by the climatic system 3. The most probable situation and similar climatic situations are thus determined by the detecting system 3. At block 4, then, according to the most probable climatic situation, a climate adjustment and adaptation of similar climatic situations are then performed. A fictitious user intervention 5 is transmitted to the climate control apparatus 1, according to which the climate control apparatus 1 regulates the settings of the heating and/or air-conditioning apparatus.

Figure 2:
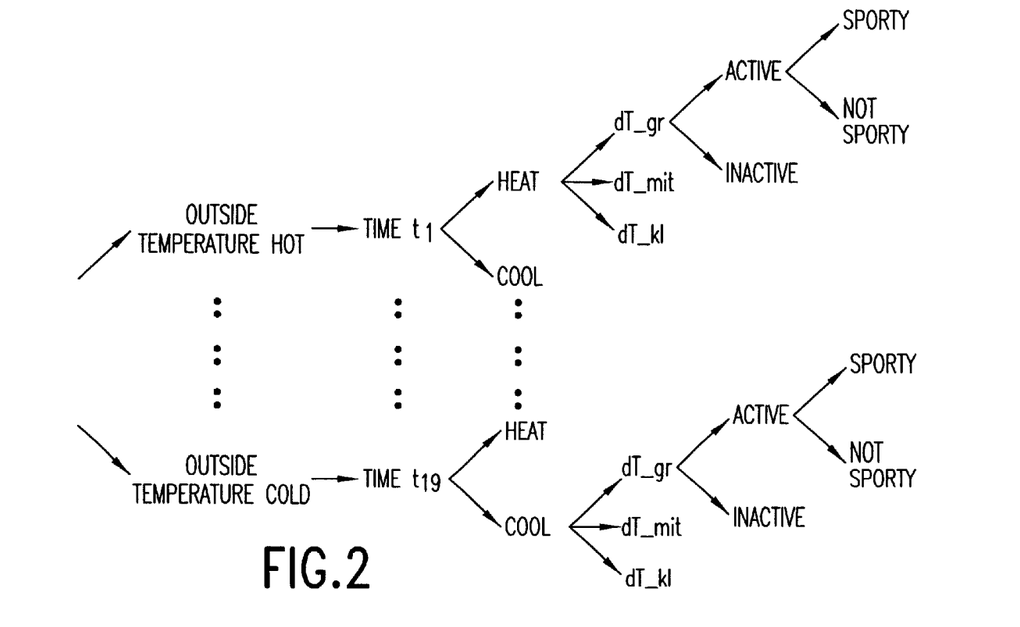
FIG. 2 is a situation diagram in accordance with the invention.

FIG. 2 shows the situation decision tree forming the basis of the detection of the climatic situation. The vehicle climate and the climatic situation in the vehicle depends on many factors and environmental influences, which cannot be learned or described with sufficient accuracy. With the situation detection algorithm, with a number of factors which are further described below, the prevailing climatic situation is detected and classified.

1. Time is an important measure for the detection of climatic situations and ways of behavior, since many interventions are performed in relation to time.

2. The distinction regarding the outside temperature is important since not only do persons' ways of behavior change (e.g., at −15° C.) but also the clothing they wear. As a result, there are different individual patterns with regard to the climate control system.

The differentiation is accomplished with the outside temperature Ta. This value, however, is determined only at the start of a trip, since the outside temperature during the trip causes the inside temperature to vary and thus the influence of the outside temperature also has to be taken into account.

3. The case of heating or cooling depends on the difference between the inside set temperature and the actual inside temperature. When the difference dT is negative, the case calls for cooling. The inside temperature is too high and must be reduced by means of refrigeration. A case for heating occurs similarly, in a diametrically opposite manner.

4. An important factor is also the magnitude of the difference between the inside temperature and the set temperature. This magnitude is determinative for various control strategies of the system and of the user, since if the difference is great, e.g., the blower speed is increased or the temperature of the air from the outlets is varied.
5. Another factor is the activity of the driver. A very active driver has a higher thermal potential and therefore needs less heating or more cooling power. This value is called hereinafter the nft.
6. Another factor is "sporty" driving, which is expressed hereinafter by the sport factor. A sporty driver will be inclined to employ user interventions different from those of a driver who drives more sedately. A sporty driver must devote more alertness to traffic, for example, than a sedate driver, and therefore will tend to employ different user interventions.

Each of these factors is assigned a probability of the existence of this state. To obtain the probability of one of these situations, the individual probabilities are multiplied together. Each of the above listed six indicators are shown in FIG. 2 which schematically represents a sample breakdown rather then specifically illustrate each and every one of the examples. It can be seen that there are 24 possible combinations of climatic situations derived from the individual situations. That is, the top portion of FIG. 2, after it has broken down into heating or cooling, has an illustration of heating followed by three different magnitudes of temperature difference between the inside and outside of the automobile. dTgr represents a large temperature change between the inside temperature and a set temperature. dTkl represents a small change and dTmit represents an average change The greater outside temperature (dTgr) is broken down into active and inactive and the active portion is further broken down into sporty or not sporty. The selection of the cooling in the top portion of FIG. 2 would also have the same breakouts for temperature, activity and sportiness. This is illustrated by the example at the bottom of FIG. 2 which takes the selection of the cooling instead of the heating for a breakdown and which shows the breakdown of the three temperature variations for cooling, as well as an illustration of a breakdown from an average or a middle temperature (dTmit) into the active and inactive followed by the sporty or not sporty. The 24 situations are derived based on the fact that there are two (2) possibilities of either heating or cooling followed by three (3) possibilities for temperature variation between the inside temperature and the set temperature and two (2) variations of activity and lastly, two (2) indications of sportiness. The product 24 results from the multiplication of these numbers (2×3×2×2). A specific climatic situation is then associated with each intervention by the driver. If even more factors are involved, the number of possible climatic situation increases.

Figure 3:
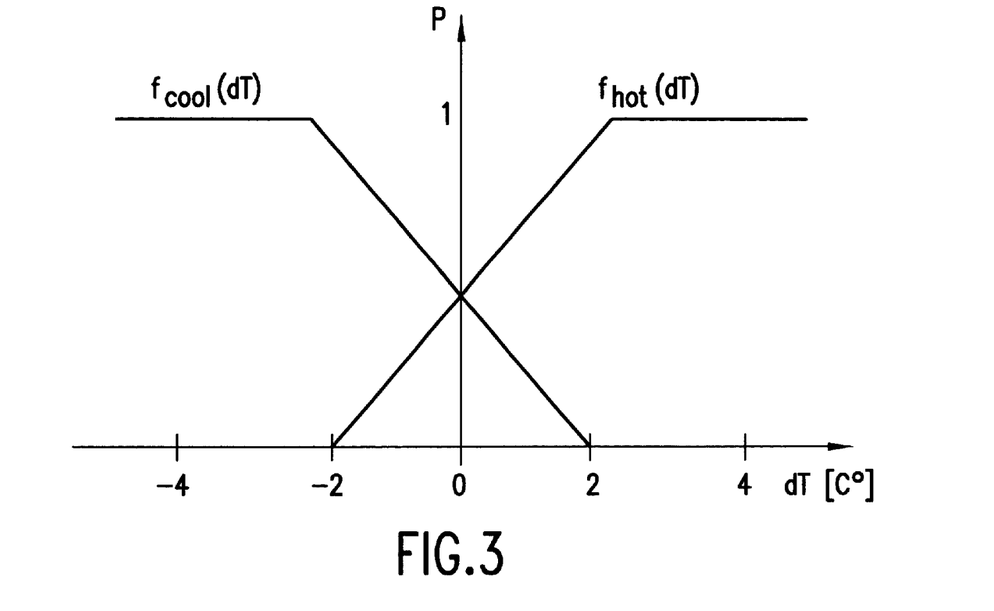
FIG. 3 is a graph for studying individual probabilities.

FIG. 3 shows in a diagram the individual probability of the heating-cooling factor. The transition between heating and cooling is considered gradual. This consideration takes place in functions that are defined in sections but are continuous, which in the sum of the individual functions is always 1 per factor. The other functions are analogous thereto. Each factor has the value 1 if the situation is unequivocal and values between 1 and 0 are assigned proportionally. The sum of the factors of the individual situation portions is always 1. By multiplying the different individual situations it is possible to determine the situation that is present with the greatest possibility. As an example, FIG. 3 shows that for a value of dT>2, the probability of $f_{hot}(dT)$ is 1 and for values of dT<−2 the probability of $f_{cool}$ (dT) is 1. For values of dT between −2 and +2, the values of $f_{cool}$ and $f_{hot}$ are less than 1, but the sum of the probabilities is always 1. Therefore, for all indication of the dT the sum of the individual probabilities is one.

Figure 4:
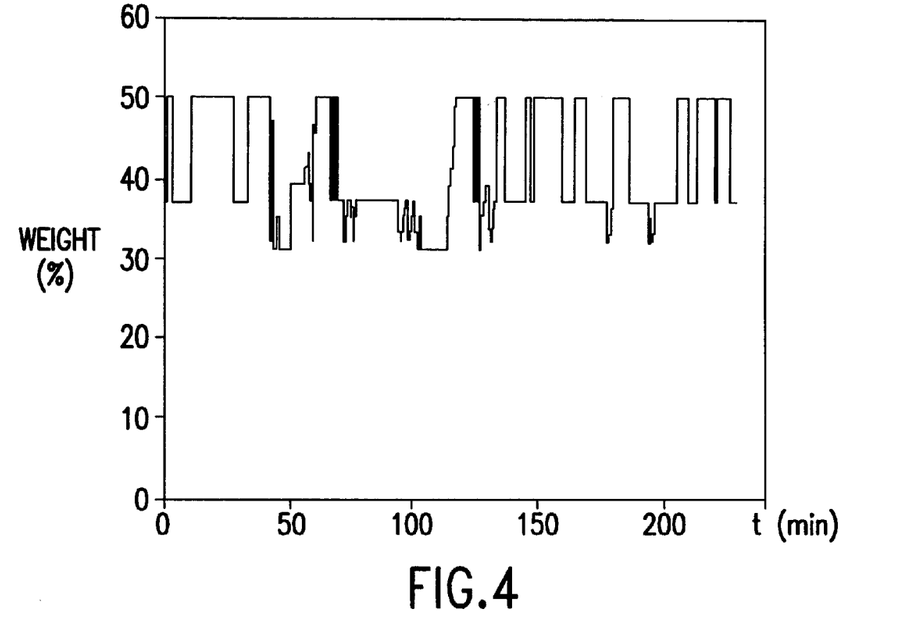
FIG. 4 is a graph of the probabilities of the air-conditioning situation.
Figure 5:
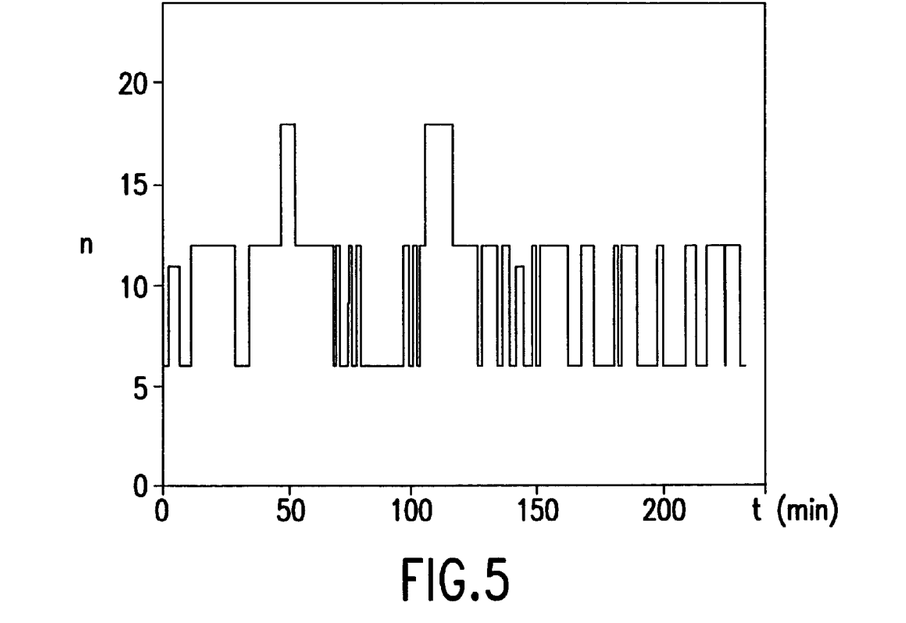
FIG. 5 is a graph of the probability of situation number n.

In FIG. 4, the maxima of the situation probabilities P is shown, and in FIG. 5 the corresponding situation number n of a real trip over the time t is shown. The probabilities vary considerably. Thus, there are marginal conditions which cannot with great probability be associated unequivocally with a climatic situation. No identification of the climatic situation is possible and thus no definite association of a user intervention is possible. A very probable climatic situation has a probability of more than 30%. Other similar climatic situations are also classified, which also have a certain probability. These climatic situations are therefore to a certain extent similar to one another. This similarity is described as a quotient of the similar situation divided by the most probable climatic situation. This quotient gives as a percentage the degree of similarity to the other climatic situation. For example, if climatic situation 12 has a probability of 80% and climatic situation 17 the probability of 20%, then climatic situation 17 has a similarity of 25% to climatic situation 12.

Figure 6:
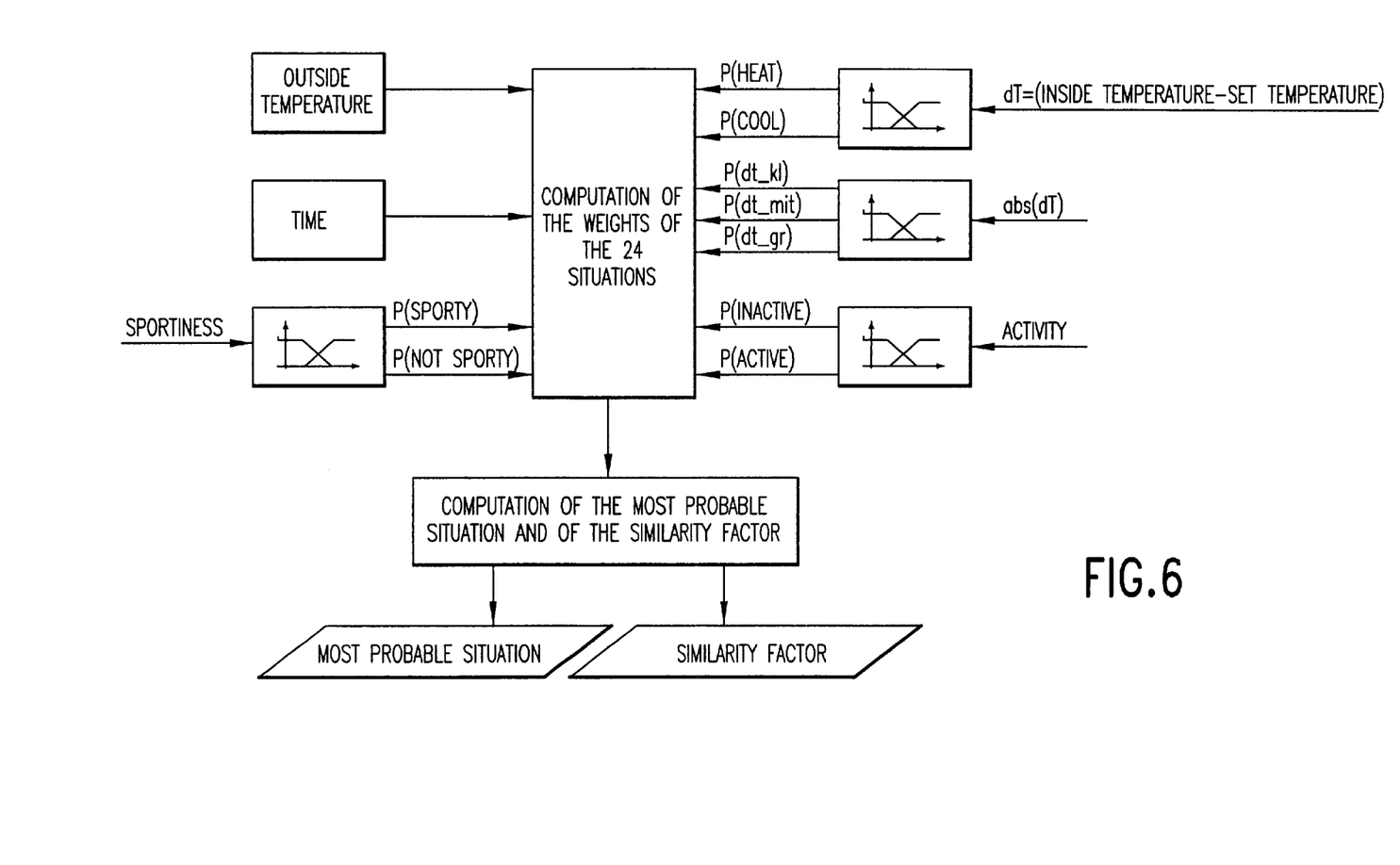
FIG. 6 is a flow diagram showing the development of the air-conditioning situation according to the invention.

FIG. 6 shows a flow diagram of the process of detecting the climatic situation according to the invention. For the learning and setting algorithm, the climatic situation detector must perform the following steps and make the results available for further use.

Determination of the outside temperatures;

Determination of the time range;

Determination of the situation with the maximum weight;

Determination of similar situations and their probability (any situation whose probability is greater than zero is considered to be similar); and Determination of the similarity factor by dividing the similar situations and the situation by the maximum probability.

In this embodiment, 24 climatic situations are classified, which lead to a great extent to different settings of the climate control system. In the following embodiment, for the sake of better comprehension, only the left set drivers's temperature and the blower speed stage are considered as controlling factors. Any expansion to the other possible settings of the climate control system can easily be performed. A basic setting of the climate control system is associated with each climatic situation. For all climatic situations, a medium blower stage to and an inside set temperature of 22° C. are chosen, for example, as the basic setting. If at the start of the trip no climatic situation has been definitely classified, since the climatic situation probability is less than 30%, the basic setting of the climate control system is preset. This applies even when the association of the 24 climatic situations with the user interventions has long since been made, but no climatic situation has a probability that is greater than 30%. If, at the start of a trip a climatic situation was clearly recognized, the climate control system is adjusted with the values of the associated user intervention. In general, the climatic situation can be subject to a change which makes itself perceptible by a personal influence (change in the sportiness of the driver) or a peripheral influence (change in the inside temperature and inside set temperature difference). The predetermined time can be, for example, 10 seconds. Thus, brief changes in the climatic situation, caused by brief activity, do not lead to the execution of adjustments of the climate control system. If the change in the climatic situation lasts longer than the predetermined time, the setting of the heating and/or air-conditioning system associated with this climatic situation according to the associated user intervention is performed again. If, due to a change in the climatic situation, an adjustment of more than one step is necessary, the new setting is ramped-up. In case of a raising of the blower speed by two steps, first only one step is added. The next increase is not performed until after a predetermined time of, for example, 20 seconds. This slow change of the settings promotes the feeling of comfort, since the automatic change in the setting is performed imperceptibly.

If the automatic adjustment leads to an unpleasant inside climate, the driver lets the setting go. If the climate in the car is not optimal, the driver will perform a user intervention. This user intervention, in order to make it possible for the driver to correct an unintended user intervention, is associated with the prevailing climatic situation only after a predetermined time. The coordination of a user intervention with a climatic situation is performed in predetermined steps, and complete coordination will take place only when this intervention has been repeated for the same climatic situation. A user intervention must be repeated for the same climatic situation before a definite coordination is performed. This assures that there is a reason for the user intervention and it is intended upon the next occurrence of the situation. The repetition rate of the user intervention assures a greater measure of reliability. Similar climatic situations are considered together, so that an adaptation is made to the adjacent climatic situations. This result is determined by the use of the similarity factor. This brings it about that similar climatic situations adapt themselves and thus a continuous association is made possible. The similar climatic situations adapt themselves together toward the most probable climatic situation and thus, in the event of a change in the climatic situation, they permit a greater probable desired setting of the climate control system, since the tendencies of the individual user interventions are also given consideration.

The learned association is stored in a 3-dimensional matrix of the size of 7×19×24. The axes of the matrix represent the outside temperature ranges, the time range and the climatic situation. The content of the matrix is the settings of the climate control system, i.e., the desired inside set temperature and blower speed setting. The adaptation is performed not only punctually at the point at which a user intervention was performed but also in a range around the point. As regards the outside temperature, this range contains two ranges, one before and one after the actual range, and as regards time, two ranges ahead of the present point in time are taken into consideration. The time into the future is not included if at this point in time nothing has yet been learned (learning flag not set), since at the present time the operator desires the setting and wishes no more changes in the immediate future, unless he has already expressed this by a user intervention that has been made. This change would result after another trip, since then the learned time profile would have been followed with the climate control system. But if something has already been learned in the next two time ranges, the new setting is also taken into consideration in the future. In order to allow for the user intervention also in the period after the intervention, the learned interventions of the present time will follow. That is, if the user intervention took place in the second minute (e.g., adjustment of the internal set temperature from 22° C. to 23° C.) and the learned value in this example amounts to 22.4° C., then the corresponding performance graph point of the third minute is learned in reference to the present setting.

By entering NO the next time, the user therefore implicitly confirms his desired and already made setting. This entry is performed in the same manner also in similar situations. The following steps occur in the Adaptation.
1) Determination of the delta interval of the actual and desired state from the one previously learned, stored in the matrix and the set user intervention.
2) Adaptation of the learned user interventions or basic setting with the following instruction:

$$\text{new\_value}(ta, t, index) = \begin{cases} \text{old\_value}(ta, t, index) + \\ \text{delta} * (-0.05 * ((ta-2)^2 + (t-2)^2) + 04) * \\ \text{sim\_fact}(index) \end{cases} \quad (4.1)$$

wherein $ta \in \{Z; [-2; 2]\}$ and $t \in \{Z; [-2, 2]\}$ (elliptical paraboloid)

It is learned therefore also in an outside temperature and time environment.
3) The adaptation of similar situations is performed with the same formula, but the adaptation dimension is multiplied by the corresponding similarity factor.
4) Entry in memory of the newly learned user intervention.
5) Learning of the new setting also in the next time window including the similar situations, if in this time period no new user intervention or change in situation takes place.
6) Learning of the new setting, even in the event of a change in situation lasting longer than 10 sec, including similar situations, if no new user intervention or change in situation takes place.

Figure 7:
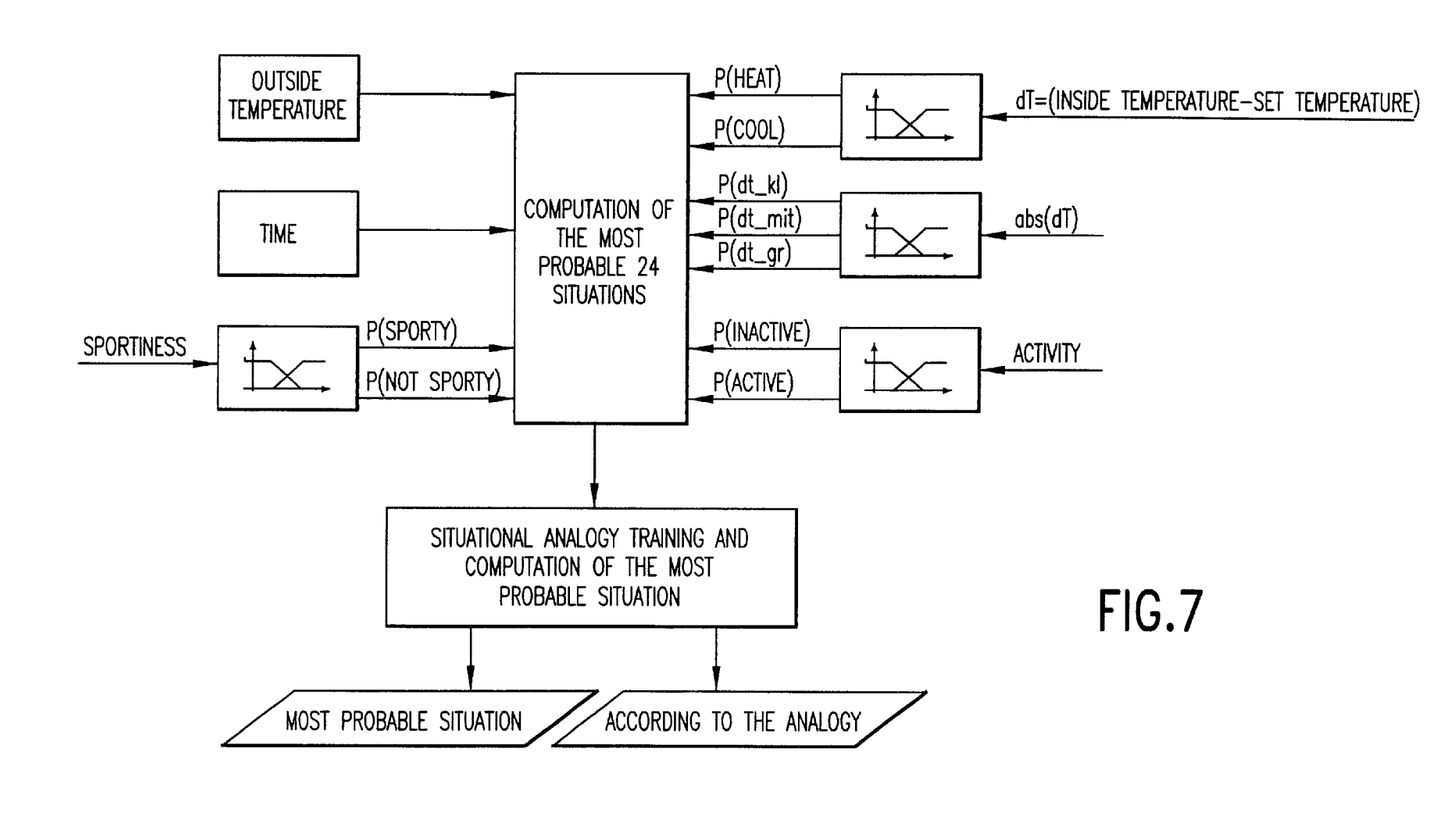
FIG. 7 is a flow diagram showing the development of the recognition of the climatic situation with an adaptation to the user according to the invention.

FIG. 7 shows a flow diagram of the process of detecting the climatic situation, with a user-related adaptation of the similar climatic situations. As an additional embodiment, the similar climatic situations can be made user-related. The adaptation of the similar climatic situations is performed with the same formula, but the adaptation dimension is multiplied by the corresponding similarity factor. This similarity is related from the ground up to the situation tree and therefore depends on the individual parameters which describe this situation. This degree of similarity is based, however, on the judgment of the developer, and it is similar to one another depending on the situation tree and it is independent of the individual estimate of the user.

In order to improve the adaptation of similar climatic situations, so that the user determines which situation is similar for him, the following rules are provided. One climatic situation is similar to another if the climatic situation change takes place without intervention by the user. The similarity factor is continuously adapted individually. The changes of the climatic situation are considered which entail a user intervention and those which do not entail a user intervention. This change of climatic situations is evaluated with a certain weight, the sign of the weight depending on whether or not a user intervention takes place. A climatic situation change without user intervention is evaluated at 5%. A climatic situation change with manual intervention is evaluated at −15%, and a learned intervention at 10%. The user interventions are given greater value, since these interventions more strongly document the difference in the climatic situations than a user intervention not performed. The manual user intervention is given greater weight since it is a direct feedback by the user to the system telling it that he evaluates this climatic situation differently and considers a user intervention to be necessary. The learned user intervention considers a decision made previously and is therefore evaluated lower.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a climate system, wherein a user performs interventions leading to different settings of the climate system, the climate system including a control unit for processing various parameters fed therein, the method comprising the acts of:

defining climatic situations for said various parameters;

recognizing a specific climatic situation for a user intervention, said specific climatic situation being associated with said user intervention; and in an event of a prevailing climatic situation, automatically performing settings of the climate system pertaining to said associated user intervention wherein the specific climatic situation is determined through parameter-related factors, each factor being provided with a probability with which a particular state is present, said individual probabilities being multiplied by one another to obtain a total probability.

2. The method according to claim 1, wherein the user intervention must be performed a predetermined time before a climatic situation is associated with this user intervention.

3. The method according to claim 1, wherein the climate system is one of a heating and air/conditioning apparatus.

4. A method for controlling a climate system, wherein a user performs interventions leading to different settings of the climate system, the climate system including a control unit for processing various parameters fed therein, the method comprising the acts of:

defining climatic situations for said various parameters;

recognizing a specific climatic situation for a user intervention, said specific climatic situation being associated with said user intervention; and in an event of a prevailing climatic situation, automatically performing settings of the climate system pertaining to said associated user intervention, wherein climatic situations similar to a user intervention with their probabilities are determined, which climatic situations are adapted in case of a change in an association of climatic situation and user intervention.

5. The method according to claim 4, wherein the specific climatic situation is determined through parameter-related factors, each factor being provided with a probability with which a particular state is present, said individual probabilities being multiplied by one another to obtain a total probability.

6. The method according to claim 5, wherein the specific climatic situation with the greatest probability prescribes the settings of the climate system associated with the user intervention.

7. The method according to claim 5, wherein climatic situations similar to a user intervention with their probabilities are determined, which climatic situations are adapted in case of a change in an association of climatic situation and user intervention.

8. The method according to claim 5, wherein for the adaptation of similar climatic situations, climatic situation changes are considered, while a climatic situation change without user intervention is evaluated with a positive probability, a learned user intervention is evaluated with a higher positive probability, and a climatic change with manual user intervention is evaluated with a still higher negative probability.

9. The method according to claim 4, wherein for the adaptation of similar climatic situations, climatic situation changes are considered, while a climatic situation change without user intervention is evaluated with a positive probability, a learned user intervention is evaluated with a higher positive probability, and a climatic change with manual user intervention is evaluated with a still higher negative probability.

10. The method according to claim 5, wherein the user intervention must be performed a predetermined time before a climatic situation is associated with this user intervention.

11. The method according to claim 5, wherein an association of a user intervention with a climatic situation is performed in predetermined steps and a complete association does not take place until this user intervention has been repeated for the same climatic situation.

12. A method for controlling a climate system, wherein a user performs interventions leading to different settings of the climate system, the climate system including a control unit for processing various parameters fed therein, the method comprising the acts of:

defining climatic situations for said various parameters;

recognizing a specific climatic situation for a user intervention, said specific climatic situation being associated with said user intervention; and in an event of a prevailing climatic situation, automatically performing settings of the climate system pertaining to said associated user intervention, wherein the specific climatic situation with the greatest probability prescribes the settings of the climate system associated with the user intervention.

13. The method according to claim 12, wherein climatic situations similar to a user intervention with their probabilities are determined, which climatic situations are adapted in case of a change in an association of climatic situation and user intervention.

14. The method according to claim 12, wherein for the adaptation of similar climatic situations, climatic situation changes are considered, while a climatic situation change without user intervention is evaluated with a positive probability, a learned user intervention is evaluated with a higher positive probability, and a climatic change with manual user intervention is evaluated with a still higher negative probability.

15. The method according to claim 12, wherein the user intervention must be performed a predetermined time before a climatic situation is associated with this user intervention.

16. The method according to claim 12, wherein an association of a user intervention with a climatic situation is performed in predetermined steps and a complete association does not take place until this user intervention has been repeated for the same climatic situation.

17. A method for controlling a climate system, wherein a user performs interventions leading to different settings of the climate system, the climate system including a control unit for processing various parameters fed therein, the method comprising the acts of:

defining climatic situations for said various parameters;

recognizing a specific climatic situation for a user intervention, said specific climatic situation being associated with said user intervention; and in an event of a prevailing climatic situation, automatically performing settings of the climate system pertaining to said associated user intervention, wherein for the adaptation of similar climatic situations, climatic situation changes are considered, while a climatic situation change without user intervention is evaluated with a positive probability, a learned user intervention is evaluated with a higher positive probability, and a climatic change with manual user intervention is evaluated with a still higher negative probability.

18. The method according to claim 17, wherein the user intervention must be performed a predetermined time before a climatic situation is associated with this user intervention.

19. A method for controlling a climate system, wherein a user performs interventions leading to different settings of the climate system, the climate system including a control unit for processing various parameters fed therein, the method comprising the acts of:

defining climatic situations for said various parameters;

recognizing a specific climatic situation for a user intervention, said specific climatic situation being associated with said user intervention; and in an event of a prevailing climatic situation, automatically performing settings of the climate system pertaining to said associated user intervention, wherein an association of a user intervention with a climatic situation is performed in predetermined steps and a complete association does not take place until this user intervention has been repeated for the same climatic situation.

20. A software product, comprising a computer readable medium having stored thereon program code segments that:

define climatic situations in accordance with various parameters received in a control unit;

determine a particular climate situation based upon a user intervention, said particular climate situation being associated with the particular user intervention; and signal an adjustment of climate control system settings in accordance with the particular user intervention and determined climatic situation from a prevailing climatic situation wherein the specific climatic situation is determined through parameter-related factors, each factor being provided with a probability with which a particular state is present, said individual probabilities being multiplied by one another to obtain a total probability.

21. A software product, comprising a computer readable medium having stored thereon program code segments that:

define climatic situations in accordance with various parameters received in a control unit;

determine a particular climate situation based upon a user intervention, said particular climate situation being associated with the particular user intervention; and signal an adjustment of climate control system settings in accordance with the particular user intervention and determined climatic situation from a prevailing climatic situation, wherein the specific climatic situation with a greatest probability prescribes the settings of the climate system associated with the user intervention.

* * * * *